United States Patent
Luo et al.

(10) Patent No.: US 11,152,841 B2
(45) Date of Patent: Oct. 19, 2021

(54) DRIVING DEVICE AND WINDOW LIFT ACTUATOR USING THE SAME

(71) Applicant: Johnson Electric International AG, Murten (CH)

(72) Inventors: Qingbin Luo, Shenzhen (CN); Guihong Tian, Shenzhen (CN); Xinpeng Wei, Shenzhen (CN); Binwei Li, Shenzhen (CN); Yueju Zhao, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 590 days.

(21) Appl. No.: 16/045,471

(22) Filed: Jul. 25, 2018

(65) Prior Publication Data

US 2019/0036427 A1 Jan. 31, 2019

(30) Foreign Application Priority Data

Jul. 25, 2017 (CN) .......................... 201710614383.5

(51) Int. Cl.
*H02K 13/14* (2006.01)
*H02K 5/14* (2006.01)
(Continued)

(52) U.S. Cl.
CPC .......... *H02K 13/14* (2013.01); *E05F 15/697* (2015.01); *H01R 39/36* (2013.01); *H01R 39/54* (2013.01); *H02K 5/146* (2013.01); *H02K 5/225* (2013.01); *H02K 5/24* (2013.01); *H02K 11/30* (2016.01); *H02K 11/38* (2016.01); *H02K 11/40* (2016.01); *E05Y 2201/10* (2013.01); *E05Y 2400/40* (2013.01); *E05Y 2400/61* (2013.01); *E05Y 2600/50* (2013.01); *E05Y 2800/232* (2013.01); *E05Y 2900/55* (2013.01);
(Continued)

(58) Field of Classification Search
CPC ........ H02K 13/14; H02K 11/38; H02K 5/146; H02K 5/225; H02K 5/24; H02K 11/30; H02K 11/40; H02K 2211/03; H02K 5/143; H02K 13/006; H01R 39/54; H01R 39/36; H01R 12/58; H01R 39/18; H01R 39/38; E05F 15/697; E05Y 2201/10; E05Y 2900/55; E05Y 2800/232; E05Y 2400/40; E05Y 2600/50; E05Y 2400/61
USPC .................................... 310/51, 239–253, 71
See application file for complete search history.

(56) References Cited

U.S. PATENT DOCUMENTS 5,810,111 A * 9/1998 Takeuchi ............. B62D 5/0406
180/443
2010/0181853 A1 7/2010 Wong et al.
(Continued)

*Primary Examiner* — Ahmed Elnakib
(74) *Attorney, Agent, or Firm* — Millman IP Inc.

(57) ABSTRACT

A driving device includes a motor and a control unit for controlling of the motor. The motor includes a motor body and an end cap assembly disposed at one end of the motor body. The motor body comprises a stator, a rotor rotatable relative to the stator, and a motor shaft fixed to and rotated with the rotor. The end cap assembly is provided with two brushes. The control unit includes two connectors for connecting with an external power source. The two brushes are respectively electrically connected to the connectors through the control unit. Lengths of connecting routes of the two brushes to the corresponding connectors are substantially equal to each other.

10 Claims, 10 Drawing Sheets

(51) Int. Cl.

| | | |
|---|---|---|
| | *H02K 5/22* | (2006.01) |
| | *H02K 5/24* | (2006.01) |
| | *H02K 11/30* | (2016.01) |
| | *H02K 11/40* | (2016.01) |
| | *H01R 39/54* | (2006.01) |
| | *E05F 15/697* | (2015.01) |
| | *H01R 39/36* | (2006.01) |
| | *H02K 11/38* | (2016.01) |
| | *H01R 12/58* | (2011.01) |
| | *H01R 39/18* | (2006.01) |
| | *H01R 39/38* | (2006.01) |

(52) U.S. Cl.
CPC .............. *H01R 12/58* (2013.01); *H01R 39/18* (2013.01); *H01R 39/38* (2013.01); *H02K 2211/03* (2013.01)

(56) References Cited

U.S. PATENT DOCUMENTS

2012/0161560 A1\* 6/2012 Mizutani ................ H02K 5/225
310/71
2016/0134073 A1 5/2016 Tokizaki et al.

\* cited by examiner

DRIVING DEVICE AND WINDOW LIFT ACTUATOR USING THE SAME

CROSS-REFERENCE TO RELATED APPLICATIONS

This non-provisional patent application claims priority under 35 U.S.C. § 119(a) from Patent Application No. 201710614383.5 filed in The People's Republic of China on Jul. 25, 2017, the contents of which are incorporated herein by reference.

FIELD OF THE DISCLOSURE

The present disclosure relates to a driving mechanism, and a window lift apparatus actuator having the driving mechanism.

BACKGROUND OF THE DISCLOSURE

Motors, especially brush motors, generate loud noises during operation due to mechanical friction and electrical reasons. For example, in brushed motors, the capacitive effect formed between brushes and the connection terminals connected to the board would couple the motor noise to the terminals, thereby transmitting noise outside. In addition, different paths of the different brushes to the external power source can cause common mode interference. This will cause electrical noise. Therefore, to reduce the noise of the motor, electrical improvement of the motor is necessary. Furthermore, in general brushed motors, electronic components such as inductors, connecting terminals, etc., are required to connect the brushes to the printed circuit board. Due to the loose arrangement of these components, the end cap structure is complicated. For example, additional terminals are used between the inductor and the brush, and as a result it is time-consuming and labor-intensive to assemble the end cap assembly.

SUMMARY OF THE DISCLOSURE

One aspect of the present disclosure provides a driving device including a motor and a control unit for controlling of the motor. The motor includes a motor body and an end cap assembly disposed at one end of the motor body. The motor body comprises a stator, a rotor rotatable relative to the stator, and a motor shaft fixed to and rotated with the rotor. The end cap assembly is provided with two brushes. The control unit includes two connectors for connecting with an external power source. The two brushes are respectively electrically connected to the connectors through the control unit. Lengths of connecting routes of the two brushes to the corresponding connectors are substantially equal to each other.

Preferably, a ratio of a difference between the lengths of connecting routes is less than 20%.

Preferably, the end cap assembly comprises a cover and a plurality of electronic components mounted on the cover, wherein the plurality of the electronic components comprises the two brushes, two inductors, and two connection terminals.

Preferably, the driving device comprises brushes that are correspondingly connected to the control unit through the inductors and the connection terminals.

Preferably, the inductors and the connection terminals are oriented in a direction parallel to the motor shaft of the motor.

Preferably, the cover is provided with two brush holders for the two brushes respectively mounted therein, two inductor mounts for the two inductors respectively mounted therein, and two terminal mounts for the connection terminals mounted therein.

Preferably, the cover defines a stepped hole, the motor further comprises a commutator received in the stepped hole, and the two brush holders are symmetrically disposed on opposite sides of the stepped hole and in communication with the stepped hole to enable the brushes to extend into the stepped hole and contact the commutator.

Preferably, the distance between each of the connection terminals and any of the brushes is at least 17 to 22 mm.

Preferably, the most capacitance between the inductors and the corresponding brushes ranges from 0.015 to 0.025 pF.

Preferably, the control unit comprises a printed circuit board, the connection terminals are electrically connected to the printed circuit board, and the connectors are provided on a side of the printed circuit board.

Preferably, the printed circuit board is supported on the cover body and oriented in a direction perpendicular to the motor shaft.

Preferably, the printed circuit board defines a plurality of conductive via holes, two leading paths are printed on the printed circuit board, opposite ends of each of the leading paths are respectively connected to one of the conductive via holes, and one of the connectors, and the connection terminals are engaged into the corresponding conductive via holes.

Another aspect of the present disclosure provides an actuator comprising the driving device described above, and a transmission mechanism driven by the driving device.

Preferably, the actuator is a window lift actuator. Preferably, an airflow passage is defined in the mounting bracket adjacent to the heat dissipating member.

Below, embodiments of the present disclosure will be described in detail with reference to the accompanying drawings.

DETAILED DESCRIPTION OF THE PREFERRED EMBODIMENTS

Figure 1:
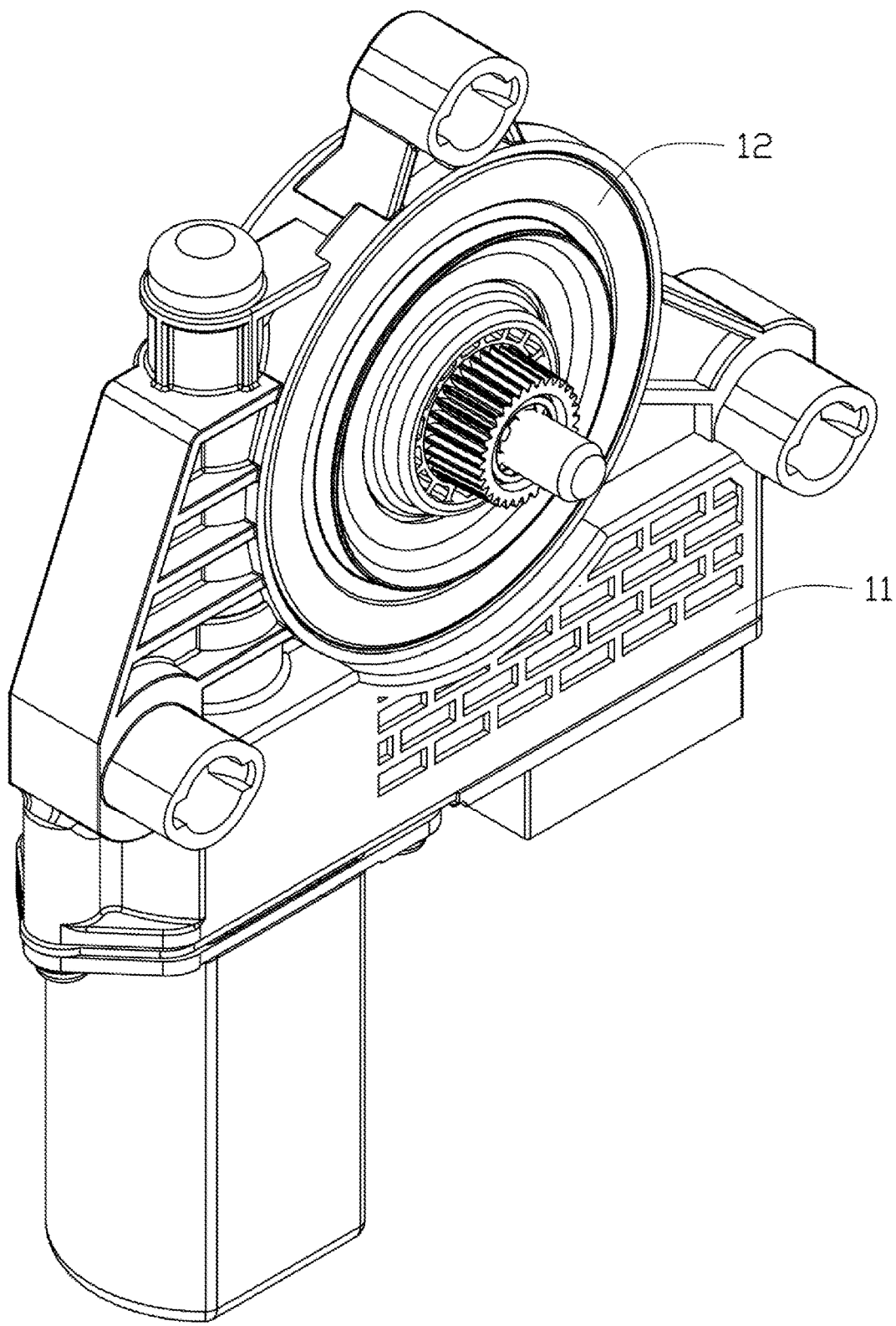
FIG. 1 is a perspective view of an actuator in an embodiment of the present disclosure.
Figure 2:
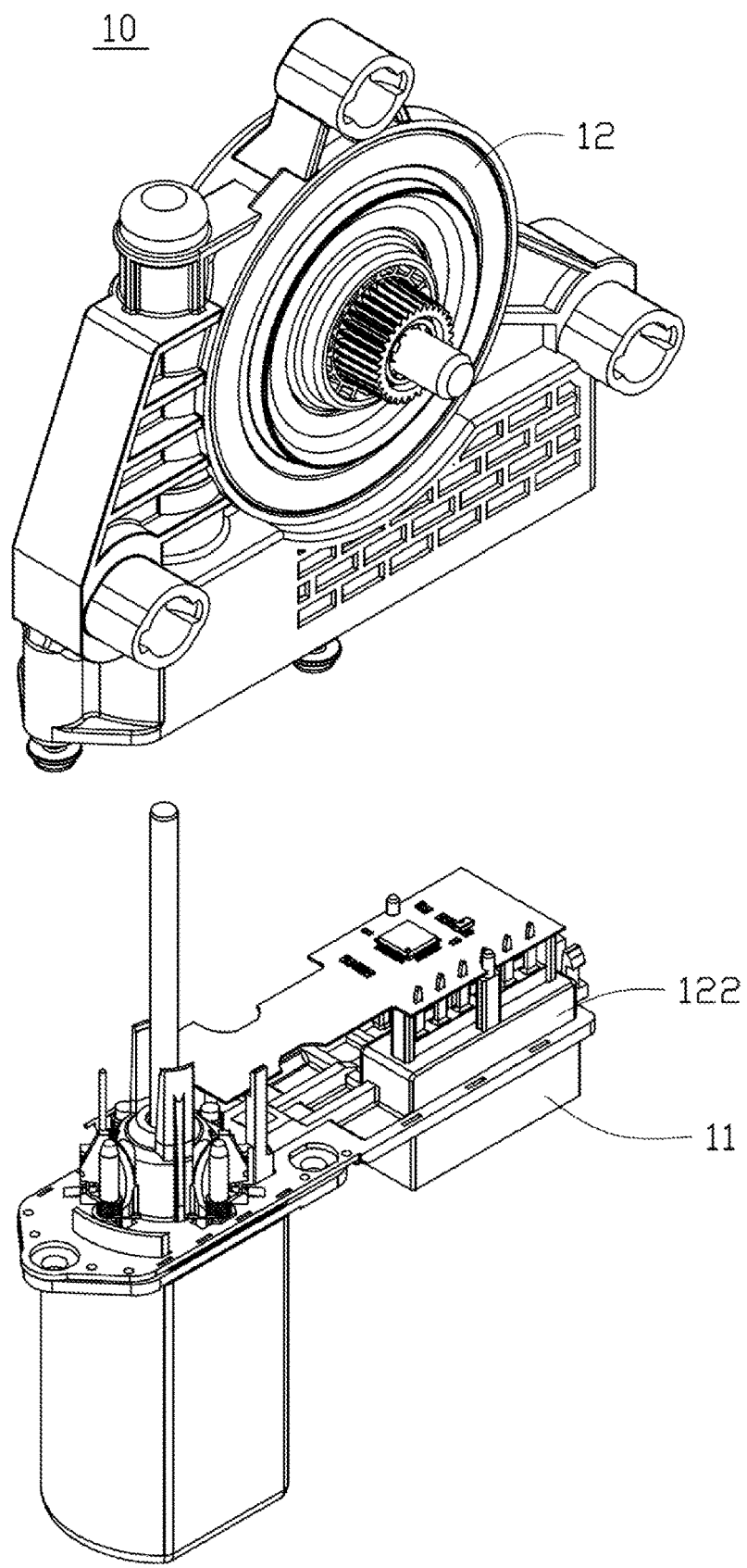
FIG. 2 is an exploded perspective view of the actuator of FIG. 1.
Figure 3:
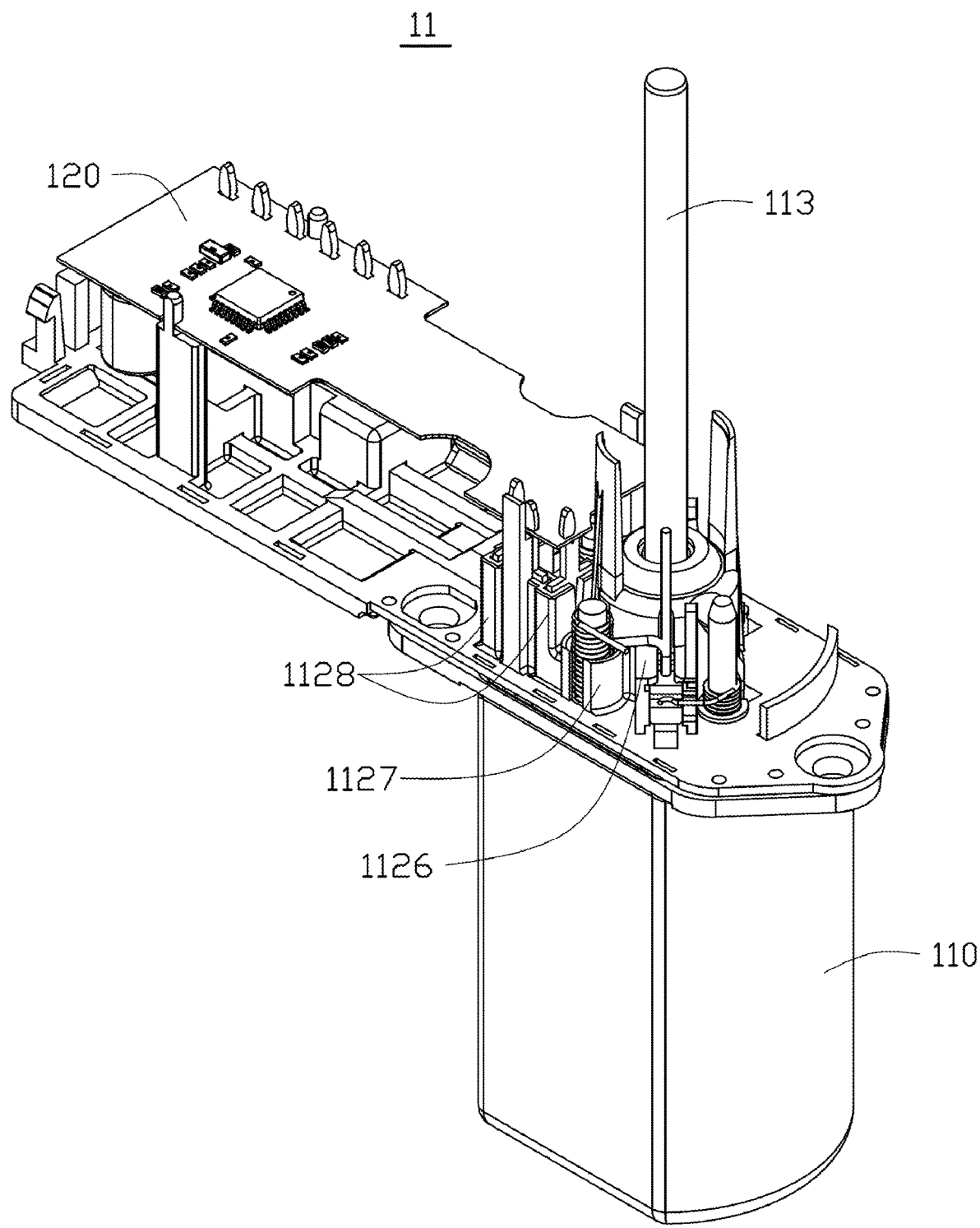
FIG. 3 is a perspective view of the driving device of the actuator shown in FIG. 2.
Figure 4:
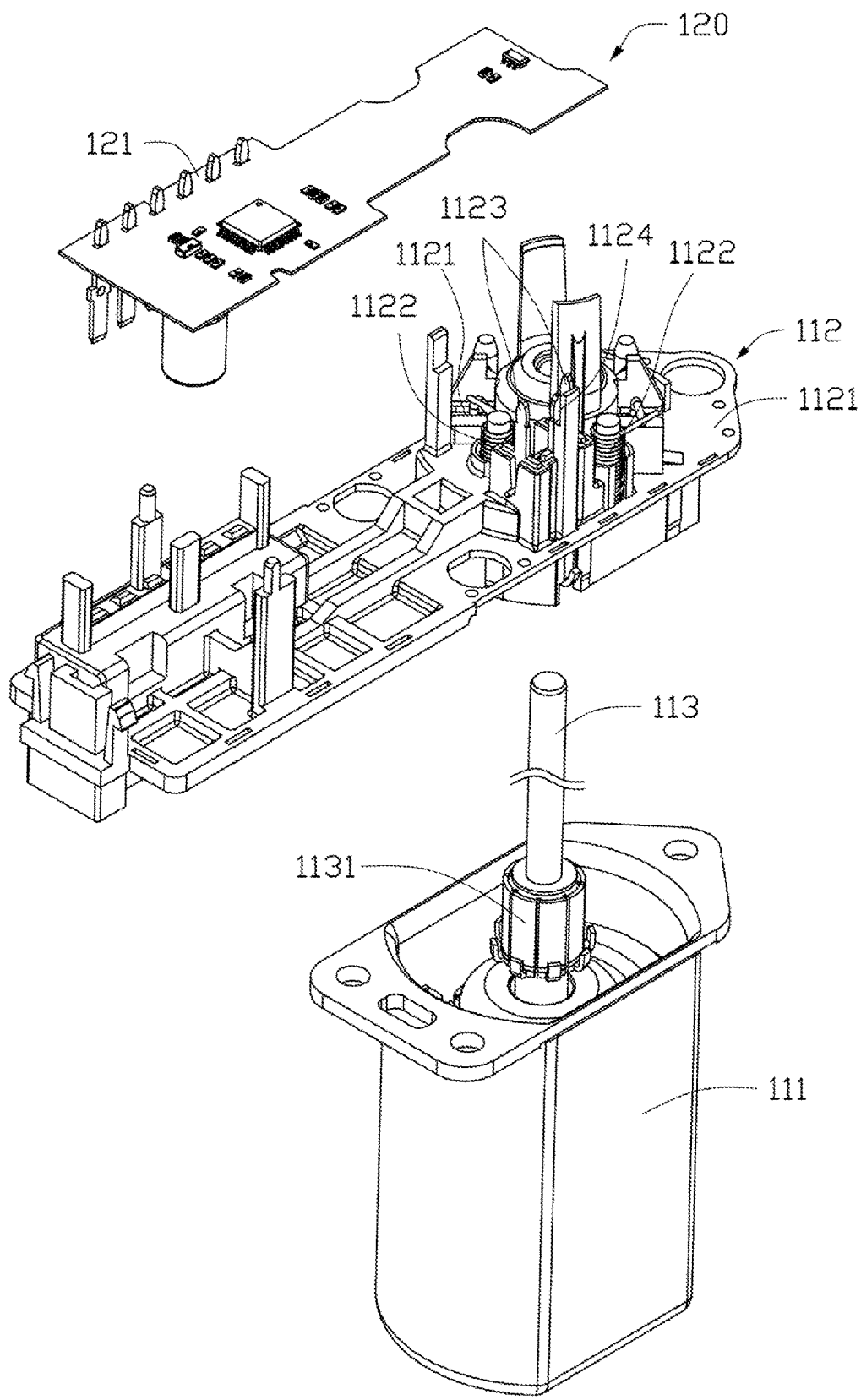
FIG. 4 is an exploded perspective view of the driving device shown in FIG. 3.
Figure 5:
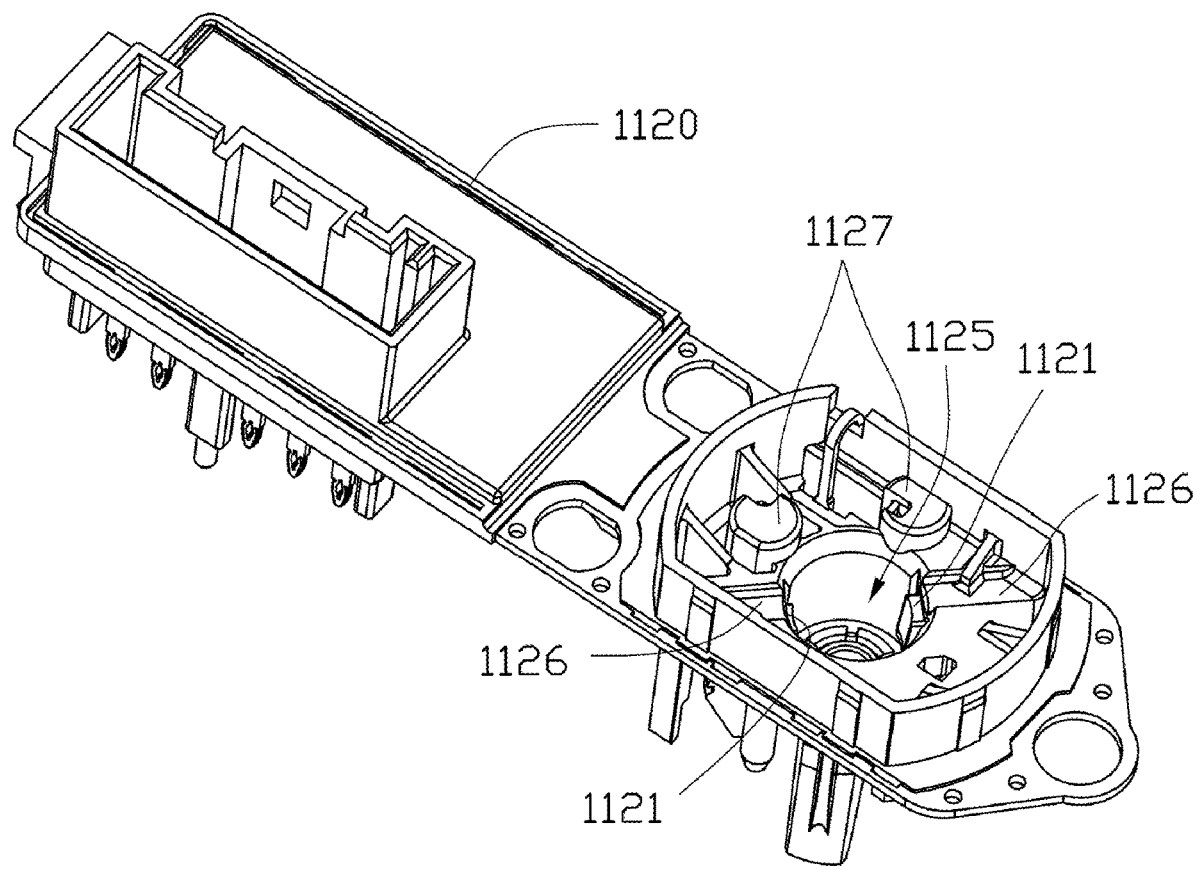
FIG. 5 is a perspective view of the end cap assembly of the driving device of FIG. 3, but shown in a different aspect.
Figure 6:
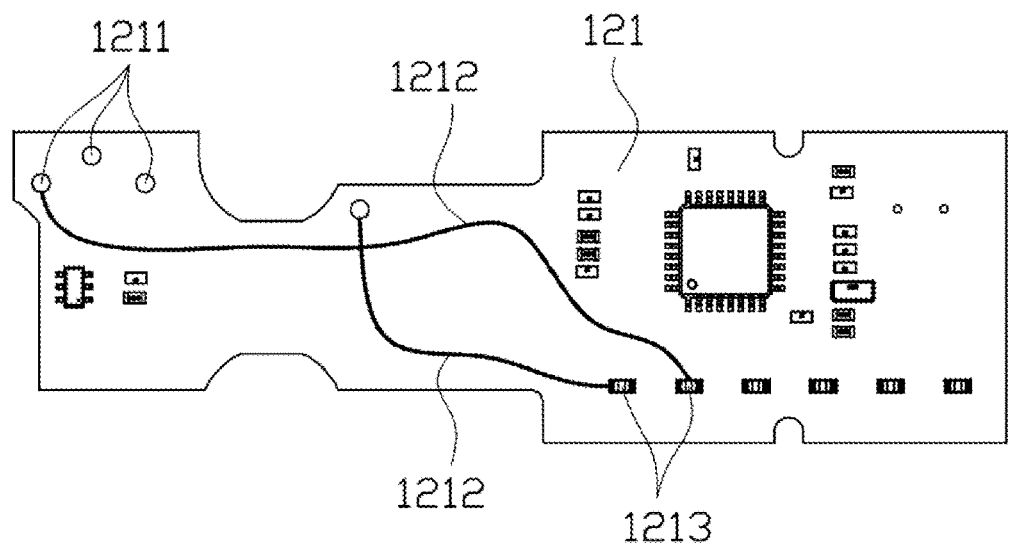
FIG. 6 is a top plan view of the control unit of the driving device shown in FIG. 3.
Figure 7:
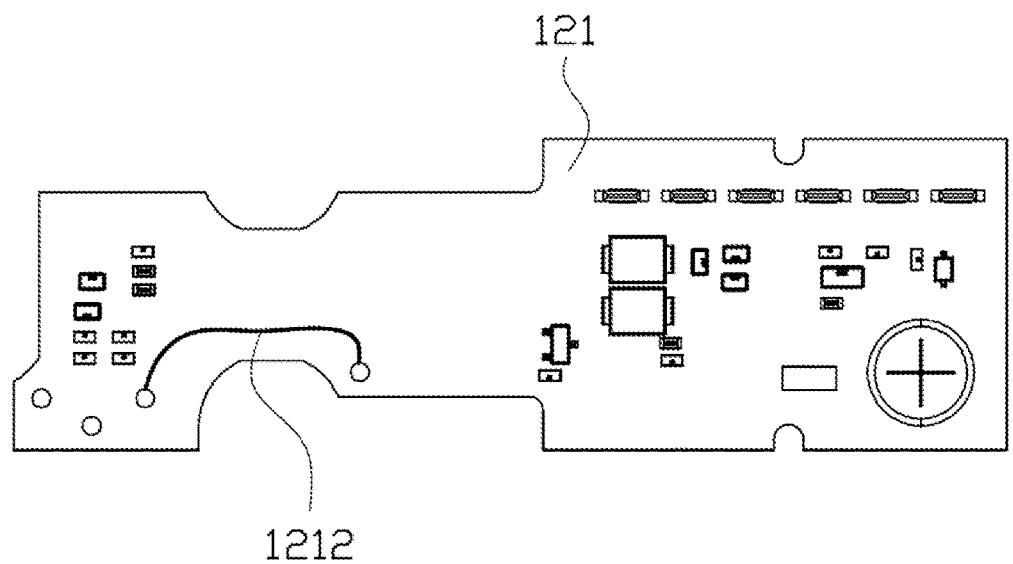
FIG. 7 is a bottom view showing the control unit shown in FIG. 6.
Figure 8:
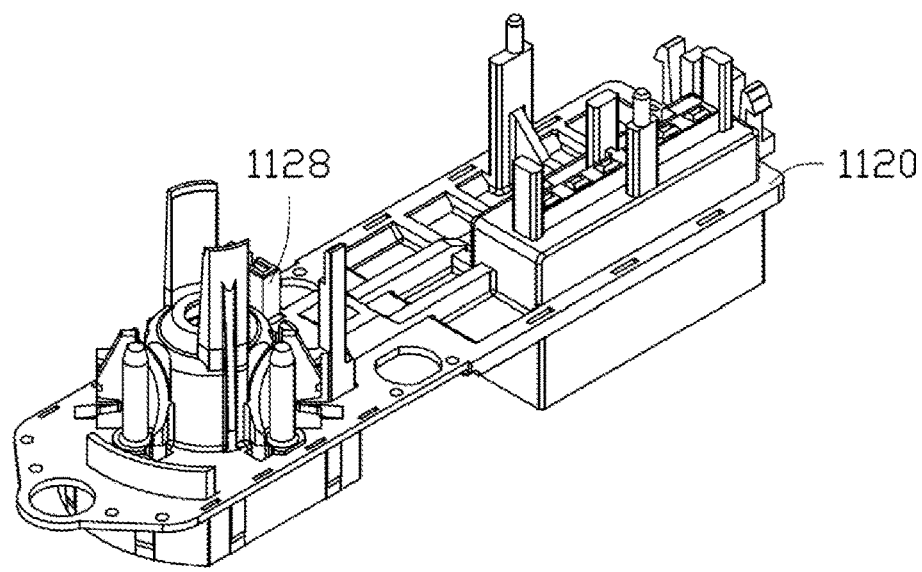
FIG. 8 is similar to FIG. 3, with the end cap assembly in a disassembled state.
Figure 8:
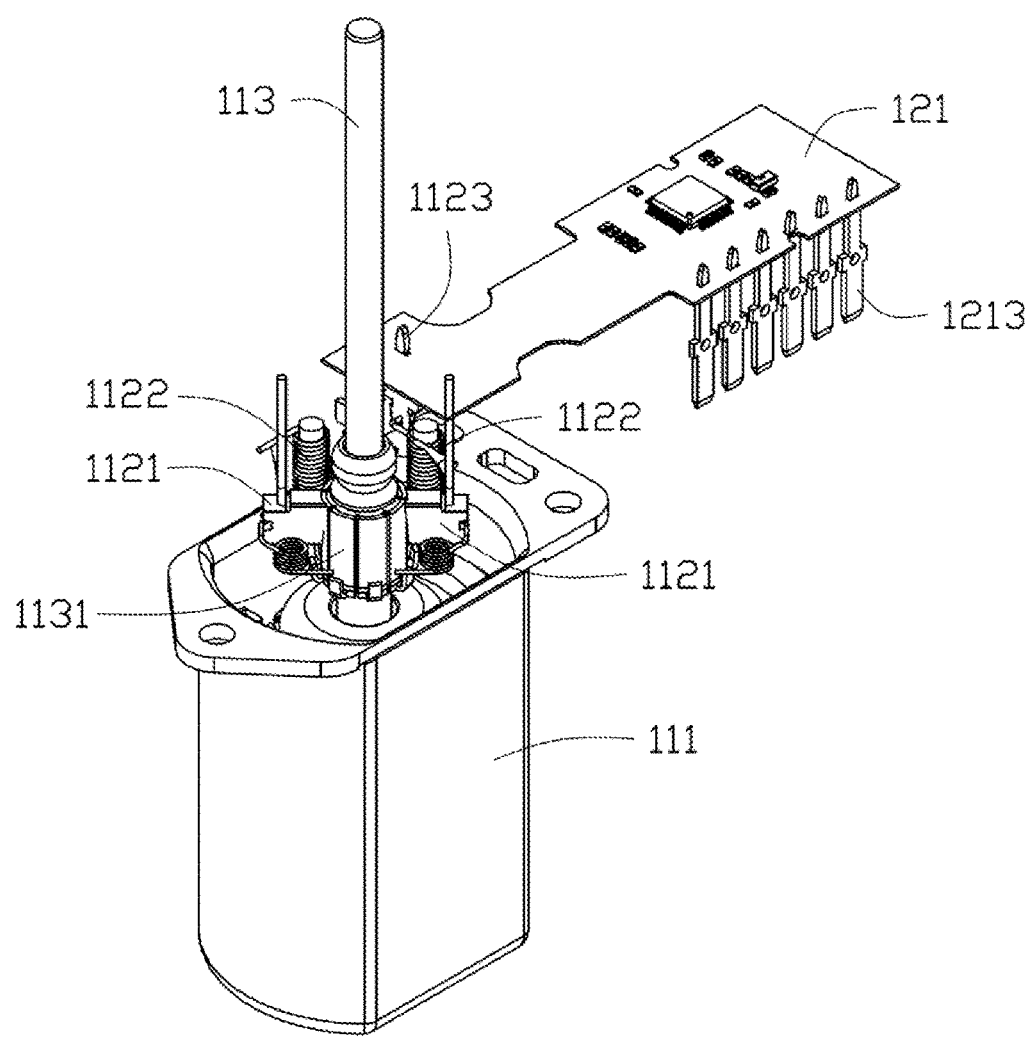
Figure 9:
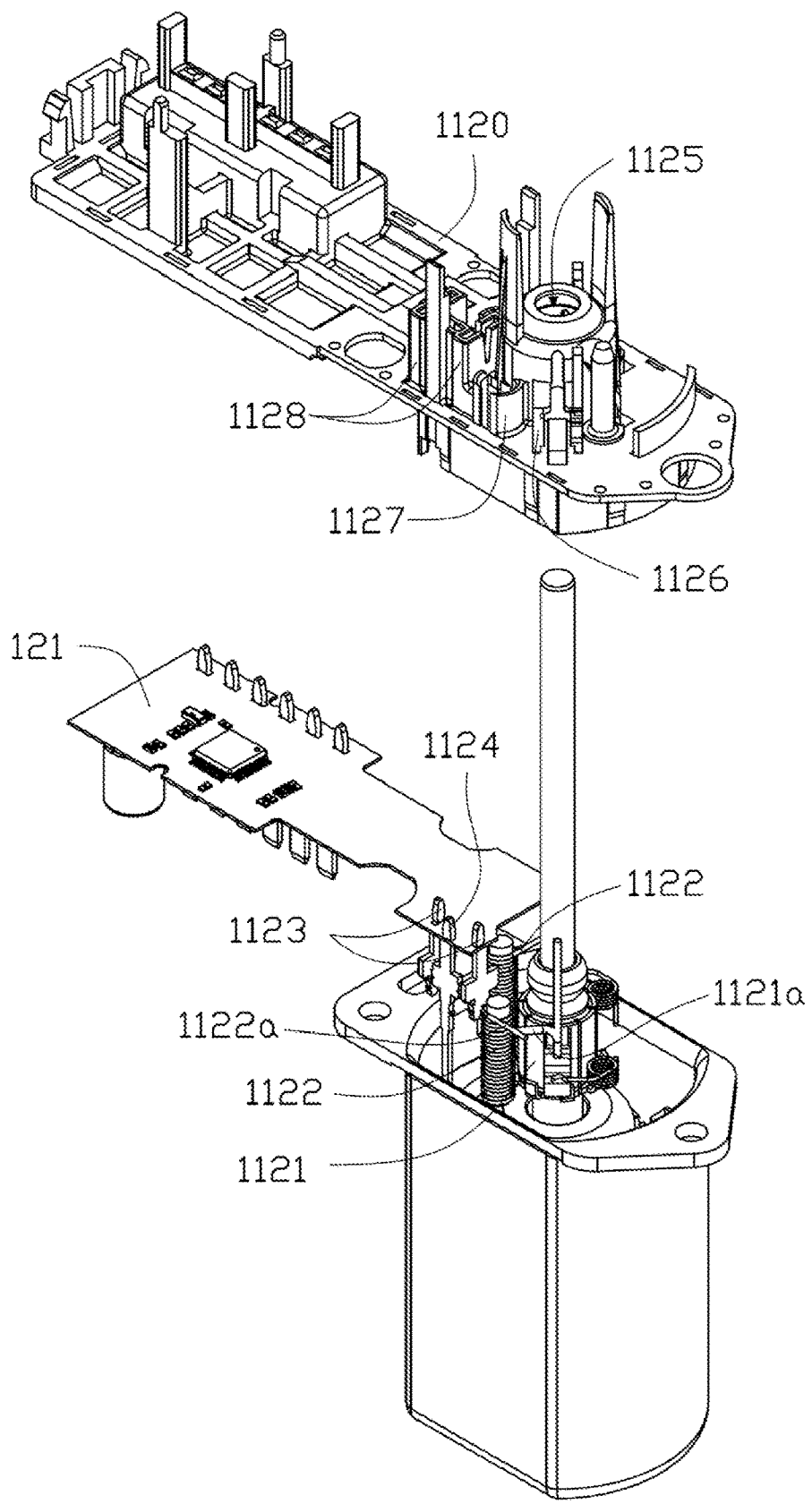
FIG. 9 is similar to FIG. 3, but shown in a different aspect.
Figure 10:
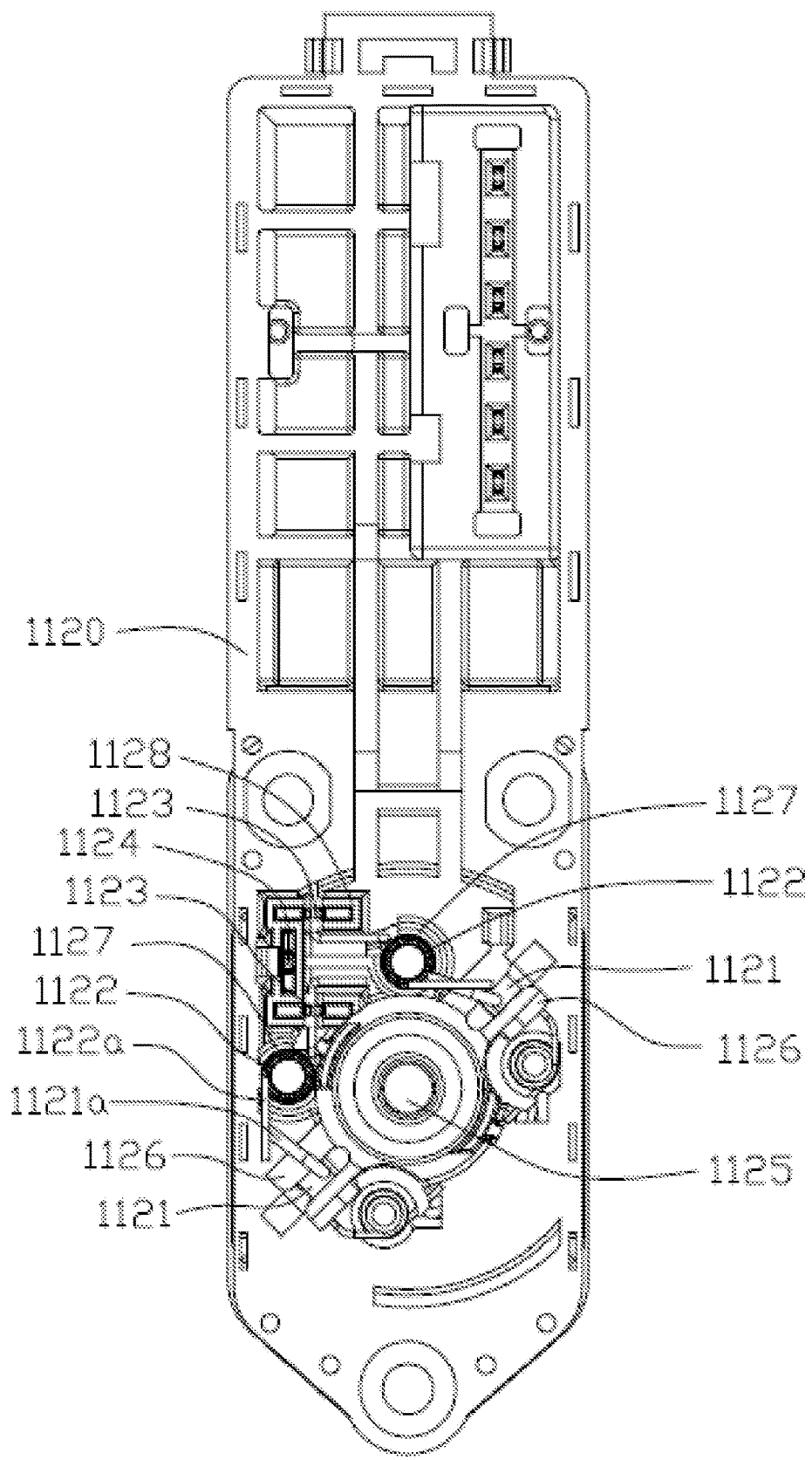
FIG. 10 is a top plan view of the drive device of FIG. 3 with the control unit removed.

Referring to FIGS. 1-2, an actuator 10 of the embodiment of the present disclosure includes a driving device 11 and a transmission mechanism 12. The driving device 11 drives the transmission mechanism 12 to rotate, thereby transmitting the power of the driving device 11.

Referring to FIGS. 3 to 7, the driving device 11 includes a motor 110 and a control unit 120 that controls the operation of the motor 110. In the present embodiment, the motor 110 is a brushed motor, and the motor 110 includes a motor body 111 and an end cap assembly 112 disposed at one end of the motor body 111. The motor body 111 includes a stator, a rotor rotatable relative to the stator, and a motor shaft 113 fixed to and rotated with the rotor. The motor shaft 113 passes through the end cap assembly 112 to be connected to and thereby driving the transmission mechanism 12. A commutator 1131 is mounted to the motor shaft 113. The end cap assembly 112 includes a cover 1120 and a plurality of electronic components mounted on the cover 1120. In the present embodiment, the plurality of the electronic components mounted on the cover 1120 includes two brushes 1121, two inductors 1122, two connection terminals 1123 and a grounding terminal 1124. Each of the brushes 1121 is connected to the control unit 120 through one of the inductors 1122 and one of the connection terminals 1123.

The control unit 120 is disposed on a side of the cover 1120 away from the motor body 111. The control unit 120 includes a printed circuit board 121 and a plurality of electronic components disposed on the printed circuit board 121, such as a connector and a control chip, etc. The printed circuit board 121 is supported on the cover body 1120. Specifically, the printed circuit board 121 is oriented in a direction perpendicular to the motor shaft 113. The printed circuit board 121 defines a plurality of conductive via holes 1211. Two leading paths 1212 are printed on the printed circuit board 121. A plurality of connectors 1213 is provided on the printed circuit board 121. Opposite ends of each of the leading paths 1212 are respectively connected to one of the conductive via holes 1211, and one of the connectors 1213. The connection terminals 1123 and the grounding terminal 1124 are engaged into the corresponding conductive via holes 1211 and electrically connected to the leading paths 1212 to enable external power source to be electrically connected to leading paths 1212 through the connector 1213. In the present embodiment, the connector 1213 extends toward the cover 1120 and is received in a connector box 122 formed on the cover 1120, and is finally connected to the external power source through an interface (not shown) of the control box 122.

Referring to FIG. 6 to FIG. 10, the two brushes 1121 are symmetrically disposed on the outer side of the commutator 1131 and abut against the commutator 1131. The two inductors 1122 are disposed parallel to the axial direction of the motor shaft 113 and adjacent to the brushes 1121, respectively. The connecting terminals 1123 extend parallel to the motor shaft 113, and are arranged on a side of the inductors 1122 away from the brushes 1121. In other words, the inductors 1122 are correspondingly disposed between the connecting terminals 1123 and the brushes 1121. Therefore, the inductors 1122 are spaced from the corresponding brushes 1121 in a relatively great distance to reduce the coupling therebetween. In the present embodiment, the distance between each connection terminal 1123 and any of the brushes 1121 is at least 17 to 22 mm, and the most capacitance between the inductors 1122 and the corresponding brushes 1121 is ranged from 0.015 to 0.025 pF.

Each of the brushes 1121 includes a brush arm 1121a. Each inductor 1122 includes two connection arms 1122a formed at opposite ends of the inductor 1122. The brush arm 1121a of each of the brushes 1121 contacts with one of the connection arms 1122a of a corresponding one of the inductors 1122, to electrically connect the inductor 1122 with the corresponding brush 1121. The other connection arm 1122a of each of the inductors 1122 is clamped to a tail portion of a corresponding one of the connection terminals 1123 to enable the inductor 1122 to be electrically connected to the corresponding connection terminal 1123. The connection terminals 1123 pass through the printed circuit board 121 to be correspondingly electrically connected with the leading paths 1212. Therefore, the brushes 1121 are connected to an external power source via the corresponding inductors 1122, the connection terminals 1123, and the printed circuit board 121. Lengths of connecting routes from the brushes 1121 to the external power source are substantially equal to each other. Specifically, in the present embodiment, lengths of connecting routes of the brushes 1121 to the corresponding connectors 1213 are substantially equal to each other. Furthermore, if a length L1 of a connecting route from one of the brushes 1121 to one of the connectors 1213 is slightly longer than a length L2 of another connecting route from the other one brush 1121 to another connector 1213, a ratio of a difference between the lengths L1 and L2 is less than 20%.

Figure 11A:
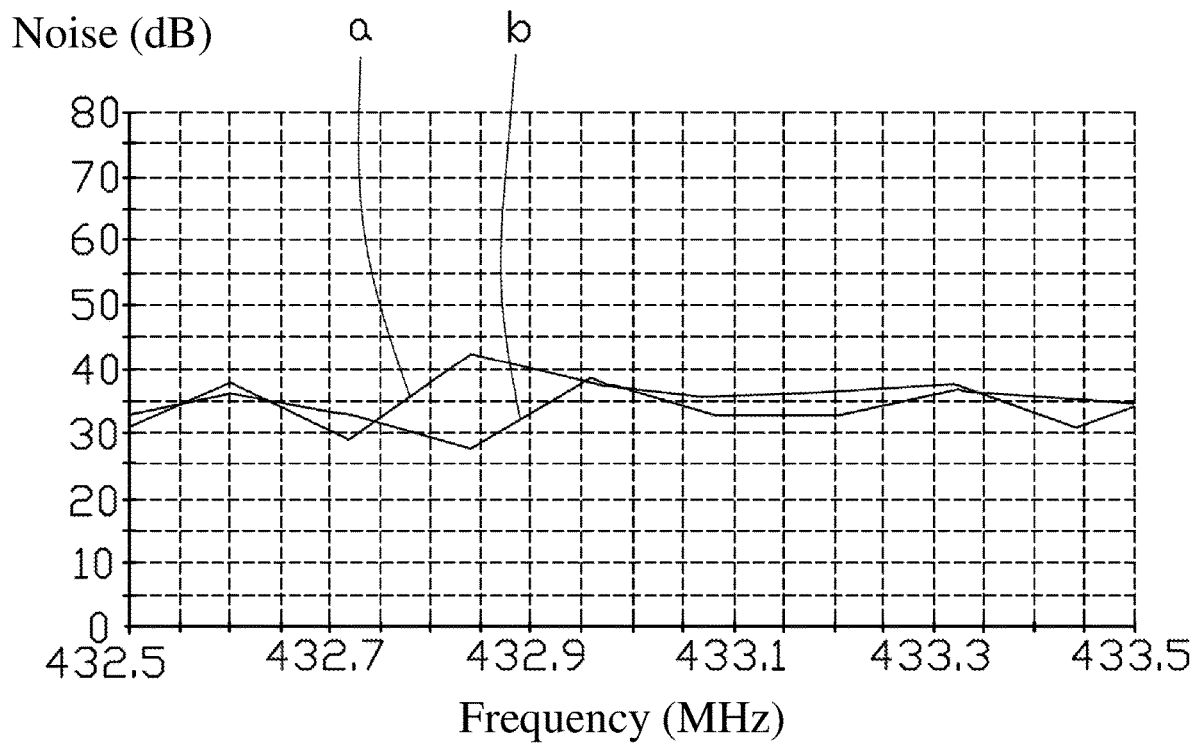
FIG. 11(a) is a diagram showing a noise text result of an actuator in the prior art.
Figure 11B:
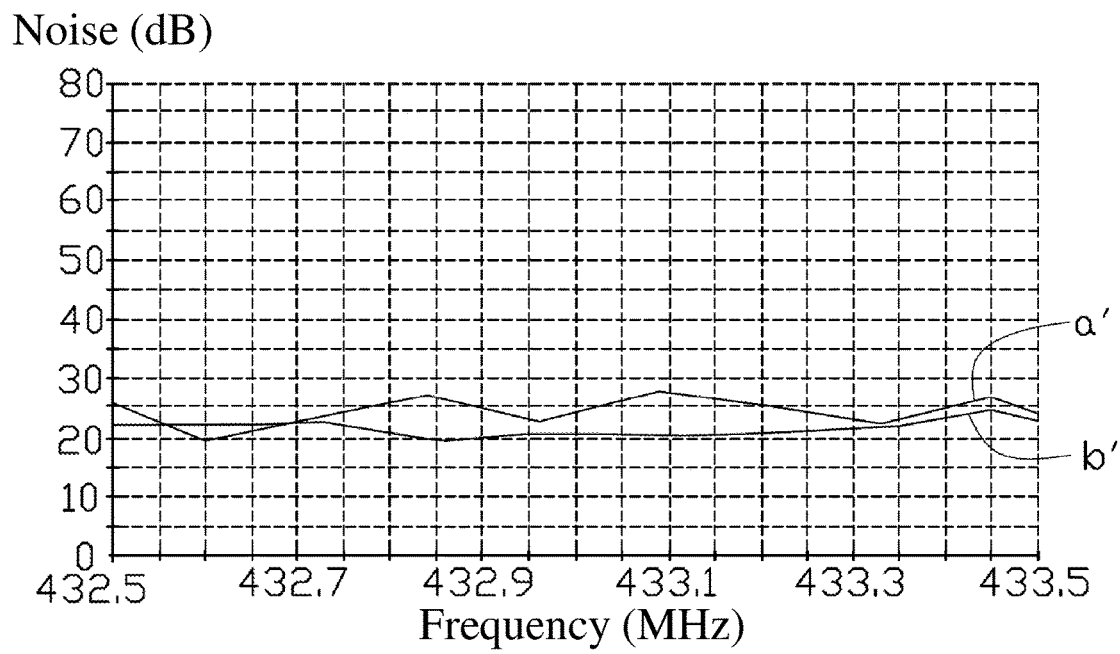
FIG. 11(b) is a diagram showing a noise text result of an actuator in an embodiment of the present disclosure.

Referring to FIGS. 11(a) and 11(b), the curves a and b in FIG. 11(a) are noise curves of an actuator of a prior art rotating clockwise and counter-clockwise, respectively. The curves a' and b' in FIG. 11(b) are noise curves of the actuator 10 of present embodiment rotating clockwise and counter-clockwise, respectively. It can be seen that, under the same test conditions, the noise generated by the actuator 10 of present embodiment is lower than the prior art whether in rotating clockwise or counter-clockwise.

Referring to FIG. 3 to FIG. 10, the end of the cover 1120 adjacent to the motor main body 111 is provided with a stepped hole 1125. The stepped hole 1125 includes a first receiving portion having a larger diameter and a second receiving portion having a smaller diameter. The first receiving portion is adjacent to the motor body 111 for accommodating the commutator 1131 disposed on the motor shaft 113. The second receiving portion is at a side of the second receiving portion away from the motor body 111 for mounting a bearing to rotatably support the motor shaft 113. Two brush holders 1126 are symmetrically disposed on opposite sides of the stepped hole 1125, for mounting the brush 1121 onto the cover 1120. Each brush holder 1126 defines a first opening (not labeled) toward the stepped hole 1125. The brushes 1121 are respectively received in the brush holders 1126, and protrude through the first openings of the corresponding brush holders 1126 to be in contact with the commutator 1131. Each brush holder 1126 defines an second opening on a side facing away from the motor body 111. The brush arms 1121a of the brushes 1121 respectively extend through the second openings to be connected to the connection arms 1122a of the corresponding inductors 1122. An inductor mount 1127 is dispensed near each of the brush holder 1126. The inductor mount 1127 has a cylindrical shape with an axis parallel to the motor shaft 113 and defines an opening on a side facing away from the motor body 111. The inductors 1122 are respectively mounted in the inductive mounts 1127, with the connection arms 1122a thereof extend from the openings of the corresponding inductive mounts 1127. A plurality of terminal mounts 1128 are disposed on a side of the inductor mount 1127 facing away from the two brush holders 1126 for mounting the connecting terminals 1123 and a grounding terminal 1124, respectively. Each terminal mount 1128 defines an opening in an end of the terminal mounts 1128 facing away from the motor body 111, and the ends of the connecting terminals 1123 and grounding terminal 1124 extend out of the corresponding terminal mounts 1128.

The actuator 10 of the present embodiment can be applied to a window lift actuator for a vehicle.

Although the disclosure is described with reference to one or more embodiments, the above description of the embodiments is used only to enable people skilled in the art to practice or use the disclosure. It should be appreciated by those skilled in the art that various modifications are possible without departing from the spirit or scope of the present disclosure. The embodiments illustrated herein should not be interpreted as limits to the present disclosure, and the scope of the disclosure is to be determined by reference to the claims that follow.

What is claimed is:

1. A driving device, comprising:
   a motor comprises a motor body and an end cap assembly disposed at one end of the motor body, the motor body comprising a stator, a rotor rotatable relative to the stator, and a motor shaft fixed to and rotated with the rotor, the end cap assembly is provided with two brushes, and
   a control unit for controlling of the motor, the control unit comprising two connectors for connecting with an external power source; wherein the two brushes are respectively electrically connected to the connectors through the control unit, lengths of connecting routes of the two brushes to the corresponding connectors are substantially equal to each other;
   wherein the end cap assembly comprises a cover and a plurality of electronic components mounted on the cover, the plurality of the electronic components comprises the two brushes, two inductors, and two connection terminals;
   wherein the brushes are correspondingly connected to the control unit through the inductors and the connection terminals;
   wherein the control unit comprises a printed circuit board, the connection terminals are electrically connected to the printed circuit board, the connectors is provided on a side of the printed circuit board;
   wherein the printed circuit board defines a plurality of conductive via holes, two leading paths are printed on the printed circuit board, opposite ends of each of the leading paths are respectively connected to one of the conductive via holes, and one of the connectors; the connection terminals are engaged into the corresponding conductive via holes.

2. The driving device of claim 1, wherein a ratio of a difference between the lengths, to any of the lengths is less than 20%.

3. The driving device of claim 1, wherein the inductors and the connection terminals are oriented in a direction parallel to the motor shaft of the motor.

4. The driving device of claim 3, wherein the cover is provided with two brush holders for the two brushes respectively mounted therein, two inductor mounts for the two inductors respectively mounted therein, and two terminal mounts for the connection terminals mounted therein.

5. The driving device of claim 4, wherein the cover defines a stepped hole, the motor further comprises a commutator received in the stepped hole, the two brush holders are symmetrically disposed on opposite sides of the stepped hole and in communication with the stepped hole to enable the brushes to extend into the stepped hole and contact with the commutator.

6. The driving device of claim 3, wherein the distance between each of the connection terminals and any of the brushes is at least 17 to 22 mm.

7. The driving device of claim 3, wherein the most capacitance between the inductors and the corresponding brushes is ranged from 0.015 to 0.025 pf.

8. The driving device of claim 1, wherein the printed circuit board is supported on the cover body and oriented in a direction perpendicular to the motor shaft.

9. An actuator comprises the driving device of claim 1, and a transmission mechanism driven by the driving device.

10. The actuator of claim 9, wherein the actuator is a window lift actuator.

* * * * *